(12) United States Patent
Hara et al.

(10) Patent No.: US 12,391,812 B2
(45) Date of Patent: Aug. 19, 2025

(54) FIBER-DISPERSED RESIN COMPOSITE MATERIAL, MOLDING, AND COMPOSITE MEMBER

(71) Applicant: FURUKAWA ELECTRIC CO., LTD., Tokyo (JP)

(72) Inventors: Hidekazu Hara, Tokyo (JP); Jae Kyung Kim, Tokyo (JP); Jiro Sakato, Tokyo (JP); Jirou Hiroishi, Tokyo (JP); Toshihiro Suzuki, Tokyo (JP); Masami Tazuke, Tokyo (JP); Masato Ikeuchi, Tokyo (JP); Kyosuke Yamazaki, Tokyo (JP); Kentaro Yabunaka, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 785 days.

(21) Appl. No.: 17/670,918

(22) Filed: Feb. 14, 2022

(65) Prior Publication Data
US 2022/0162409 A1 May 26, 2022

Related U.S. Application Data

(63) Continuation of application No. PCT/JP2021/021687, filed on Jun. 8, 2021.

(30) Foreign Application Priority Data

Jun. 10, 2020 (JP) .................. 2020-100883

(51) Int. Cl.
C08J 5/24 (2006.01)
(52) U.S. Cl.
CPC ........... C08J 5/247 (2021.05); *C08J 2323/06* (2013.01); *C08J 2423/06* (2013.01)
(58) Field of Classification Search
CPC ........................................................ C08J 5/24
USPC ........................................................ 524/34
See application file for complete search history.

(56) References Cited

U.S. PATENT DOCUMENTS

| | | | |
|---|---|---|---|
| 11,261,318 B2 * | 3/2022 | Sawada | C08K 3/08 |
| 2013/0309493 A1 | 11/2013 | Suzuki et al. | |
| 2016/0230320 A1 | 8/2016 | Ueno et al. | |
| 2018/0304555 A1 | 10/2018 | Ahn et al. | |
| 2020/0010654 A1 | 1/2020 | Kim et al. | |
| 2020/0062921 A1 | 2/2020 | Hara et al. | |
| 2020/0079920 A1 | 3/2020 | Sawada et al. | |
| 2020/0190299 A1 | 6/2020 | Hiroishi et al. | |
| 2020/0190305 A1 * | 6/2020 | Sawada | C08L 1/00 |
| 2020/0190306 A1 | 6/2020 | Hara et al. | |
| 2021/0221988 A1 | 7/2021 | Hara et al. | |

FOREIGN PATENT DOCUMENTS

| | | |
|---|---|---|
| CN | 105531414 A | 4/2016 |
| CN | 110248993 A | 9/2019 |
| CN | 111065679 A | 4/2020 |
| CN | 112752639 A | 5/2021 |
| EP | 3 441 425 A1 | 2/2019 |
| EP | 3 892.433 A1 | 10/2021 |
| EP | 3 892 434 A1 | 10/2021 |
| EP | 3 926 005 A1 | 12/2021 |
| EP | 3 978 571 A1 | 4/2022 |
| JP | 4-329132 A | 11/1992 |
| JP | 11-60650 A | 3/1999 |
| JP | 2013-540913 A * | 11/2013 |
| JP | 2019-203137 A | 11/2019 |
| JP | 2019-210406 A | 12/2019 |
| WO | WO 2010/038784 A1 | 4/2010 |
| WO | WO 2012/070616 A1 | 5/2012 |
| WO | WO 2018/105174 A1 | 6/2018 |

(Continued)

OTHER PUBLICATIONS

International Search Report for PCT/JP2021/021687 mailed on Aug. 31, 2021.
Extended European Search Report for corresponding European Application No. 21822927.6, dated May 31, 2024.
Chinese Office Action and Search Report for corresponding Chinese Application No. 202180004225.2, dated Apr. 28, 2023, with English translation.
Office Action issued in corresponding Japanese Application No. 2021-558590 on Jul. 8, 2025, with English translation.

*Primary Examiner* — Deve V Hall
(74) *Attorney, Agent, or Firm* — Birch, Stewart, Kolasch & Birch, LLP

(57) ABSTRACT

A fiber-dispersed resin composite material, containing fiber dispersed in a resin, wherein the content of the fiber in the fiber-dispersed resin composite material is 1 mass % or more and less than 70 mass %, and wherein the fiber-dispersed resin composite material has a maximum color difference A determined under conditions below of 0.05 or more and 6 or less:

<Conditions>

L*, a*, and b* values in CIE (L*a*b*) color space are measured on a straight line at 8 points with an interval of 1 cm by using a chromameter, and a color difference $\Delta E1$ between measurement points linearly adjacent to each other is calculated by [Expression 1-1] below while a maximum value among 7 calculated values for the resulting color difference $\Delta E1$ is set as the maximum color difference A, $$\Delta E1 = [(L^*_{i+1} - L^*_i)^2 + (a^*_{i+1} - a^*_i)^2 + (b^*_{i+1} - b^*_i)^2]^{0.5} \quad \text{[Expression 1-1]}$$

where $L^*_i$, $a^*_i$, and $b^*_i$ are the L*, a*, and b* values at i-th measurement point among the 8 measurement points, and i is an integer of 1 to 7 in [Expression 1-1].

13 Claims, No Drawings

(56) References Cited

FOREIGN PATENT DOCUMENTS

WO     WO 018/180469 A1    10/2018
WO     WO 2019/039569 A1    2/2019
WO     WO 2019/039571 A1    2/2019
WO     WO-2019039570 A1 *   2/2019  ............. B29B 17/02

* cited by examiner

FIBER-DISPERSED RESIN COMPOSITE MATERIAL, MOLDING, AND COMPOSITE MEMBER

CROSS-REFERENCE TO RELATED APPLICATIONS

This application is a Continuation of PCT International Application No. PCT/JP2021/021687 filed on Jun. 8, 2021, which claims priority under 35 U.S.C. § 119 (a) to Japanese Patent Application No. 2020-100883 filed in Japan on Jun. 10, 2020. Each of the above applications is hereby expressly incorporated by reference, in its entirely, into the present application.

FIELD OF THE INVENTION

The present invention relates to a fiber-dispersed resin composite material, a molding, and a composite member.

In order to improve mechanical properties of resin products, fiber-reinforced resins formed by blending reinforcing fiber (e.g., glass fiber, ceramic fiber, synthetic resin fiber, carbon fiber, cellulose fiber) in a resin have been known. Among them, plant fiber is light-weight, leaves less combustion residues during, for instance, thermal recycling, is also relatively inexpensive, and is thus advantageous in view of weight reduction, recycling efficiency, cost performance, and others. Technologies related to fiber-reinforced resins using plant fiber have been reported. For example, Patent Literature 1 describes a composite material obtained by kneading, with a matrix resin, a composite material in which wax is adhered to dried waste pulp fiber subjected to defibration treatment, wherein the defibrated waste pulp fiber has a length-weighted average fiber length of from 0.1 to 5.0 mm.

CITATION LIST

Patent Literature

Patent Literature 1: WO 2012/070616

SUMMARY OF THE INVENTION

Technical Problem

In each fiber-reinforced resin, the fiber and the resin are incompatible, and there is a restriction in improving dispersibility of the fiber in the resin. As a result, color unevenness is likely to occur in the appearance of the fiber-reinforced resin, and the coloring is unstable. The color of the resulting resin product may be adjusted to a desired color tone by blending a pigment(s) and/or a dye(s). Such coloring may be adjusted in the fiber-reinforced resin. Even in this case, color unevenness is likely to appear, and as a result of which coloring stabilization is restricted.

The present invention provides a fiber-dispersed resin composite material that is a composite material obtained by dispersing fiber in a resin and exhibits stable coloring with little color unevenness in appearance. The present invention also provides a molding or composite member using the composite material.

Solution to Problem

The above problems of the present invention have been solved by the following solutions.

[1]
A fiber-dispersed resin composite material, containing fiber dispersed in a resin,
wherein the content of the fiber in the fiber-dispersed resin composite material is 1 mass % or more and less than 70 mass %, and
wherein the fiber-dispersed resin composite material has a maximum color difference A determined under conditions below of 0.05 or more and 6 or less:
<Conditions>
L*, a*, and b* values in CIE (L*a*b*) color space are measured on a straight line at 8 points with an interval of 1 cm by using a chromameter, and a color difference $\Delta E1$ between measurement points linearly adjacent to each other is calculated by [Expression 1-1] below while a maximum value among 7 calculated values for the resulting color difference $\Delta E1$ is set as the maximum color difference A, $$\Delta E1 = [(L^*_{i+1} - L^*_i)^2 + (a^*_{i+1} - a^*_i)^2 + (b^*_{i+1} - b^*_i)^2]^{0.5} \quad \text{[Expression 1-1]}$$

where $L^*_i$, $a^*_i$, and $b^*_i$ are the L*, a*, and b* values at i-th measurement point among the 8 measurement points, and i is an integer of 1 to 7 in [Expression 1-1].

[2]
The fiber-dispersed resin composite material described in [1], which has a maximum color difference B determined under conditions below of 0.05 or more and 4 or less:
<Conditions>
L*, a*, and b* values in CIE (L*a*b*) color space are measured on a straight line at 8 points with an interval of 1 cm by using a chromameter, and a color difference $\Delta E2$ is calculated by [Expression 1-2] below while a maximum value among 8 calculated values for the resulting color difference $\Delta E2$ is set as the maximum color difference B, $$\Delta E2 = [(L^*_i - L^*_{ave})^2 + (a^*_i - a^*_{ave})^2 + (b^*_i - b^*_{ave})^2]^{0.5} \quad \text{[Expression 1-2]}$$

where $L^*_i$, $a^*_i$, and $b^*_i$ are the L*, a*, and b* values at i-th measurement point among the 8 measurement points, and i is an integer of 1 to 8 in [Expression 1-2], and where $L^*_{ave}$ is an average of the L* values at the 8 measurement points, $a^*_{ave}$ is an average of the a* values at the 8 measurement points, and $b^*_{ave}$ is an average of the b* values at the 8 measurement points.

[3]
The fiber-dispersed resin composite material described in [1] or [2], wherein a length-weighted average fiber length of the fiber is 0.3 mm or more.

[4]
The fiber-dispersed resin composite material described in any one of [1] to [3], wherein the content of the fiber in the fiber-dispersed resin composite material is 5 mass % or more and less than 50 mass %.

[5]
The fiber-dispersed resin composite material described in any one of [1] to [4], wherein the fiber contains plant fiber.

[6]
The fiber-dispersed resin composite material described in [5], wherein the content determined by measurement protocol below of the plant fiber in the fiber-dispersed resin composite material is 5 mass % or more and less than 50 mass %:

<Measurement Protocol> a sample of the fiber-dispersed resin composite material is subjected to a thermogravimetric analysis under a nitrogen atmosphere at a heating rate of +10° C./min and a content of the plant fiber in the fiber-dispersed resin composite material is calculated from [Formula I] below:

(the content (mass %) of the plant fiber)=(a decrease in mass of the sample at 200 to 380° C.)×100/ (mass of the sample before the thermogravimetric analysis). [Formula I]

[7]

The fiber-dispersed resin composite material described in any one of [1] to [6], wherein the resin contains one or two or more kinds of a polyolefin resin, an acrylonitrile-butadiene-styrene copolymer resin, an acrylonitrile-styrene copolymer resin, a polyamide resin, a polyvinyl chloride resin, a polyethylene terephthalate resin, a polybutylene terephthalate resin, a polystyrene resin, a 3-hydroxybutyrate-co-3-hydroxyhexanoate polymer resin, a polybutylene succinate resin, and a polylactic acid resin.

[8]

The fiber-dispersed resin composite material described in any one of [1] to [7], containing aluminum dispersed in the resin.

[9]

The fiber-dispersed resin composite material described in any one of [1] to [8], containing one or more kinds of compounds of a metal salt of an organic acid, an organic acid, and silicone.

[10]

The fiber-dispersed resin composite material described in any one of [1] to [9], containing resin particles dispersed in the resin dispersing the fiber contained in the fiber-dispersed resin composite material, wherein the resin particles are made of a resin different from the resin dispersing the fiber contained in the fiber-dispersed resin composite material.

[11]

The fiber-dispersed resin composite material described in any one of [1] to [10], wherein at least part of the resin and/or at least part of the fiber is derived from a recycled material.

[12]

A molding, which is obtainable by using the fiber-dispersed resin composite material described in any one of [1] to [11].

[13]

A composite member, containing: the molding described in [12]; and another material in combination.

Advantageous Effects of Invention

A fiber-dispersed resin composite material or a molding or composite member using the composite material according to the invention can exhibit stable coloring with little color unevenness in appearance while the fiber-dispersed resin composite material is shaped by dispersing fiber in a resin.

DESCRIPTION OF EMBODIMENTS

Preferable embodiments of the present invention will be described.

[Fiber-Dispersed Resin Composite Material]

In a fiber-dispersed resin composite material of the present invention (hereinafter, also simply referred to as "composite material of the present invention"), fiber is dispersed in a resin, and the content of the fiber in the composite material (100 mass %) of the present invention is 1 mass % or more and less than 70 mass %. By setting the content of the fiber within this range, the fiber can be dispersed highly homogeneously under melt-kneading conditions described later, and a composite material in which color unevenness is suppressed can be easily obtained. The composite material of the present invention may be shaped by including, for instance, inorganic matter such as aluminum and/or various additives depending on the kind(s) of raw material(s) used.

As described above, the composite material of the present invention exhibits stable coloring while color unevenness is sufficiently suppressed. That is, the maximum color difference A of the composite material as determined under the following conditions is 0.05 or more and 6 or less.

<Conditions>

L*, a*, and b* values in CIE (L*a*b*) color space are measured on a straight line at 8 points with an interval of 1 cm by using a chromameter, and a color difference $\Delta E1$ between measurement points linearly adjacent to each other is calculated by [Expression 1-1] below while $$\Delta E1 = [(L_{i+1}^* - L_i^*)^2 + (a_{i+1}^* - a_i^*)^2 + (b_{i+1}^* - b_i^*)^2]^{0.5} \quad \text{[Expression 1-1]}$$

where $L^*_i$, $a^*_i$, and $b^*_i$ are the L*, a*, and b* values at i-th measurement point among the 8 measurement points. In [Expression 1-1], up to (i+1)th measurement point is present and there are 8 measurement points. Thus, i is inevitably an integer of 1 to 7.

Among the 7 color differences $\Delta E1$ calculated using [Expression 1-1], the maximum value is set as the maximum color difference A.

When the maximum color difference A is 0.05 or more and 6 or less, it is possible to obtain a composite material in which apparent coloring unevenness is effectively suppressed while fiber is included in the resin. The maximum value of $\Delta E1$ is preferably 5 or less, more preferably 4 or less, and further preferably 3 or less. In addition, by setting the maximum value of $\Delta E1$ to 0.05 or more, when dirt adheres, an effect of making the dirt inconspicuous is elicited. From this viewpoint, $\Delta E1$ is preferably 0.07 or more, more preferably 0.1 or more, and further preferably 0.2 or more. That is, a molding may be prepared using the composite material of the present invention to highly stabilize the coloring of each molding, the appearance of which is emphasized without attaching a decorative layer.

The maximum color difference A is preferably 0.07 or more and 5 or less, more preferably 0.1 or more and 4 or less, and further preferably 0.2 or more and 3 or less.

In the composite material of the present invention, the maximum color difference B determined under conditions below is preferably 0.05 or more and 4 or less.

<Conditions>

L*, a*, and b* values in CIE (L*a*b*) color space are measured on a straight line at 8 points with an interval of 1 cm by using a chromameter, and a color difference $\Delta E2$ is calculated by the following [Expression 1-2]:

$$\Delta E2 = [(L_i^* - L_{ave}^*)^2 + (a_i^* - a_{ave}^*)^2 + (b_i^* - b_{ave}^*)^2]^{0.5} \quad \text{[Expression 1-2]}$$

where $L^*_i$, $a^*_i$, and $b^*_i$ are the L*, a*, and b* values at i-th measurement point among the 8 measurement points, and i is an integer of 1 to 8 in [Expression 1-2], and where $L^*_{ave}$ is an average of the L* values at the 8 measurement points (arithmetic mean of 8 L* values), $a^*_{ave}$ is an average of the a* values at the 8 measurement points (arithmetic mean of 8 a* values), and $b^*_{ave}$ is an average of the b* values at the 8 measurement points (arithmetic mean of 8 b* values).

Among the 8 color differences ΔE2 calculated using [Expression 1-2], the maximum value is set as the maximum color difference B.

When the maximum color difference B is 0.05 or more and 4 or less, the coloring can be further stabilized. The maximum value of ΔE2 is preferably 3 or less, more preferably 2.5 or less, and further preferably 2 or less. In addition, by setting the maximum value of ΔE2 to 0.05 or more, it is possible to exert an effect of making dirt inconspicuous more reliably when the dirt adheres. From this viewpoint, ΔE2 is preferably 0.07 or more, more preferably 0.1 or more, and further preferably 0.2 or more.

The maximum color difference B is preferably 0.07 or more and 3 or less, more preferably 0.1 or more and 2.5 or less, and further preferably 0.2 or more and 2 or less.

The L*, a*, and b* values for calculating the color differences ΔE1 and ΔE2 are measured by forming a composite material or a molding into a desired sheet shape and using the resulting formed sheet. It has been confirmed that neither the color difference ΔE1 nor ΔE2 is substantially changed depending on the forming process. Note that if shaped like a sheet, the composite material or the molding can be directly subject to measurement of the L*, a*, and b* values.

In the composite material of the present invention, LL and LN preferably satisfy [Expression 2-1] below when the length-weighted average fiber length of the fiber is taken as LL and the number-averaged fiber length is taken as LN as measured under measurement condition described later.

$$1.01 < LL/LN < 1.50. \quad \text{[Expression 2-1]}$$

The above LL and LN are determined for a dissolution residue (insoluble component) obtained by immersing a composite material in a solvent miscible with a resin in the composite material, in accordance with Pulps-Determination of fiber length by automated optical analysis as specified by ISO 16065 2001 (JIS P8226 2006).

Incidentally, the solvent miscible with a resin in the composite material can be selected, if appropriate, according to the type of the resin in the composite material. When the resin is a polyolefin, examples include, but are not limited to, a hot xylene (at 130 to 150° C.) as long as the solvent is miscible with the resin in the composite material and immiscible with fiber.

More specifically, the above LL and LN are derived from the following formulas where LL is the fiber length-weighted average fiber length.

$$LL = \left(\sum n_i l_i^2\right) / \left(\sum n_i l_i\right).$$
$$LN = \left(\sum n_i l_i\right) / \left(\sum n_i\right).$$

Here, $n_i$ is the number of fibers in the i-th length range, and is the central value in the i-th length range. The "i-th" in the determination of LL and LN is irrelevant to the "i-th" in Expressions [1-1] and [1-2] described above.

LL/LN is an indicator expressing how the fiber length distribution spreads. A larger LL/LN indicates that the fiber length distribution spreads broadly, whereas a smaller LL/LN indicates a narrower fiber length distribution.

As described later, the composite material of the present invention may be obtained by combining and blending previously classified fiber materials, melt-blending them under specific conditions, and controlling the fiber length distribution to 1.01<LL/LN<1.50. At that time, the coloring of the composite material becomes stable. Note that the fiber length distribution "1.01<LL/LN<1.50" itself may be realized by contriving kneading conditions even if unclassified fiber materials are used. However, it is difficult to highly stabilize the coloring. As described above, it has been found that setting LL/LN within a specific range affects the stabilization of the coloring of the fiber-reinforced resin. However, the relationship between the coloring stabilization and the structural feature of the composite material is not necessarily clear. Here, the melt-kneading conditions to obtain the composite material should affect the coloring. Thus, it is practically difficult to clarify the above relationship in a composite material having each component integrated. In order to herein clarify the invention by clearly indicating the difference from the fiber-reinforced resin according to the prior art, each color difference is provided as a special technical feature of the composite material of the present invention. The relationship between LL/LN and, for instance, the coloring of the composite material will be described below.

When LL/LN is large, the fiber length distribution spreads widely. As the proportion of fiber longer or shorter than the average fiber length increases, the fiber length difference between the longer and shorter fibers becomes larger. That the fiber distribution spreads suitably contributes to the coloring stability. Here, to achieve desirable increased coloring stabilization, LL/LN<1.50 is preferable and LL/LN<1.40 is more preferable.

In addition, if LL/LN is small, the distribution of the fiber length is narrowed, aggregation occurs, and unevenness in coloring tends to be increased. Further, if the LL/LN is small, the proportion of long fibers is relatively lowered. As a result, the fiber reinforcing effect tends to be slightly reduced. From these viewpoints, 1.10<LL/LN is preferable.

That is, LL/LN preferably satisfies [Expression 2-2], preferably satisfies [Expression 2-3], or preferably satisfies [Expression 2-4] as follows.

$$1.10 < LL/LN < 1.40 \quad \text{[Expression 2-2]}$$
$$1.15 < LL/LN < 1.35 \quad \text{[Expression 2-3]}$$
$$1.20 < LL/LN < 1.30 \quad \text{[Expression 2-4]}$$

For instance, the fiber length of the fiber in the composite material can be measured to some extent by observing the surface of the composite material or a thin film obtained, for example, by slicing or pressing the composite material. However, with such a method of measuring the two-dimensional observation surface, it is impossible to accurately measure all the fiber lengths of individual fibers dispersed in the resin because the observation surface is limited to a specific surface. This is because fibers in the composite material include at least fibers present overlapping in the thickness direction of the thin film, or fibers arranged and inclined with respect to the observation surface. It can be considered to measure the fiber length by analysis of a transmission tomographic image obtained using, for instance, X-ray or CT. However, the contrast of the fiber in the composite material is not necessarily clear actually, and accurate measurement of the fiber length is difficult accordingly. The present inventors accurately measured the fiber length distribution of the fiber in the composite material, found the technical relationship between the measured value and the coloring stability of the composite material, which relationship has not been conventionally known, and thus completed the invention based on such findings.

In the composite material of the present invention, the content of the fiber in the composite material (100 mass %) is 1 mass % or more and less than 70 mass %. From the viewpoint of increasing the mechanical properties, the content of the fiber in the composite material is more preferably 3 mass % or more, further preferably 5 mass % or more, further preferably 10 mass % or more, and further preferably 15 mass % or more. Also, in consideration of further improving the flexural strength, the content of the fiber in the composite material is preferably 25 mass % or more.

From the viewpoint of further suppressing water absorbency in the composite material of the present invention, the content of fiber in the composite material is preferably less than 60 mass %, preferably less than 50 mass %, further preferably less than 40 mass %, and further preferably less than 35 mass %.

In the composite material of the present invention, the content of fiber is preferably 5 mass % or more and less than 50 mass %, preferably 10 mass % or more and less than 40 mass %, or preferably 15 mass % or more and less than 35 mass %.

The fiber dispersed in the composite material of the present invention preferably includes fiber having a fiber length of 0.3 mm (300 μm) or more. Mechanical strength such as flexural strength can be further improved by including the fiber having a fiber length of 0.3 mm or more. From this point of view, it is more preferable to include fiber having a fiber length of 1 mm or more.

In the composite material of the present invention, the length-weighted average fiber length of the fiber in the composite material is preferably 0.3 mm (300 μm) or more. Mechanical strength such as flexural strength can be further improved by adjusting the length-weighted average fiber length to 0.3 mm or more. From this viewpoint, the length-weighted average fiber length of the fiber is more preferably 0.4 mm or more, further preferably 0.5 mm or more, further preferably 0.6 mm or more, and further preferably 0.7 mm or more. From the viewpoint of suppressing color unevenness, the length-weighted average fiber length of the fiber in the composite material is preferably 1.3 mm or less and further preferably 1.0 mm or less.

Examples of the fiber constituting the composite material of the present invention include plant fiber, synthetic resin fiber, glass fiber, ceramic fiber, and carbon fiber. From the viewpoint of effective utilization of natural resources, plant fiber is preferable. Examples of the plant fiber include wood fiber and cellulose fiber. From the viewpoint of stability of the mechanical strength, cellulose fiber or synthetic resin fiber is preferable. From the viewpoint of effective utilization of waste materials, wood fiber or cellulose fiber is preferable. Cellulose fiber is preferable because of effective utilization of natural resources and stability of the mechanical strength. In addition, one or more kinds of fiber may be included in the composite material of the present invention.

Examples of the wood fiber material that can be used include lumber, wood, modified wood, or crushed wood, or a wood processed product using crushed wood (e.g., a fiberboard, MDF (medium-density fiberboard), particle board), and a pulverized material thereof. Examples of the cellulose fiber material that can be used include those mainly composed of cellulose. More specific examples include pulp, paper, wastepaper, paper dust, recycled pulp, paper sludge, laminated paper, broken paper of laminated paper, and packaging using laminated paper.

The fiber contained in the composite material of the present invention may be plant fiber. In this case, the content (mass %) of the plant fiber contained in the composite material is determined using a value obtained by thermogravimetric analysis as follows.

<Procedure for Determining Content of Plant Fiber>

A composite material sample (10 mg) which has been dried in advance under the atmosphere at 80° C. for 1 hour is subjected to a thermogravimetric analysis (TGA) from 23° C. to 400° C. under a nitrogen atmosphere at a heating rate of +10° C./min. Then, the content of plant fiber (mass %) is calculated by the following [Formula I]:

(content [mass %] of plant fiber)=(decrease [mg] in mass of composite material sample at 200 to 380° C.)×100/(mass [mg] of composite material sample in dried state before thermogravimetric analysis) [Formula I]

Incidentally, when the temperature is raised to 200 to 380° C. under a nitrogen atmosphere at a heating rate of +10° C./min, almost all of the plant fiber is thermally decomposed and lost. As used herein, the mass % calculated by the above [Formula I] is taken as the content of the plant fiber contained in the composite material. Incidentally, part of the plant fiber is not lost and remains within this temperature range in some cases, but when the temperature exceeds this temperature range, the plant fiber content is indistinguishable from thermolysis loss or remaining components in a case where resin components are lost or compounds degradable at high temperatures are present together, for example, and as a result, it becomes difficult to measure the plant fiber amount. Accordingly, as used herein, the mass % calculated by [Formula I] is used for determining the plant fiber amount. The relationship between the plant fiber amount and the characteristics of the composite material as determined in this way is highly relevant.

That is, when the fiber contained in the composite material of the present invention is cellulose fiber, the content of the cellulose fiber can be determined by [Formula I]. In addition, when the fiber contained in the composite material of the present invention is wood fiber, the content of the wood fiber can be determined by [Formula I].

When the composite material of the present invention contains plant fiber, the proportion of the plant fiber among the fibers in the composite material is preferably 50 mass % or more, more preferably 70 mass % or more, further preferably 80 mass % or more, and further preferably 90 mass %. It is also preferable that all the fibers in the composite material are plant fiber. When the composite material of the present invention contains plant fiber, the plant fiber includes the cellulose fiber at the content of preferably 50 mass % or more, preferably 70 mass % or more, preferably 80 mass % or more, and preferably 90 mass % or more. When the composite material of the present invention contains plant fiber, the plant fiber preferably consists of cellulose fiber.

When the fiber in the composite material of the present invention contains cellulose fiber, the content of the cellulose fiber in the composite material (100 mass %) is preferably 1 mass % or more and less than 70 mass %. From the viewpoint of improving the mechanical properties, the content of the cellulose fiber in the composite material is further preferably 3 mass % or more, further preferably 5 mass % or more, and further preferably 10 mass % or more. Also, in consideration of further improving the flexural strength, the content of the cellulose fiber in the composite material is preferably 25 mass % or more.

From the viewpoint of further suppressing water absorbency in the composite material of the present invention when the fiber contains cellulose fiber, the content of the cellulose fiber in the composite material is preferably less than 50 mass %, preferably less than 40 mass %, or preferably less than 35 mass %.

In the composite material of the present invention when the fiber contains cellulose fiber, the content of the cellulose fiber in the composite material is preferably 5 mass % or more and less than 50 mass %, preferably 10 mass % or more and less than 40 mass %, or preferably 15 mass % or more and less than 35 mass %.

In the description of the content of the cellulose fiber, the fiber constituting the composite material is preferably cellulose fiber.

The composite material of the present invention is suitable as a material constituting a molding (resin product) which requires beautiful appearance and mechanical strength at a predetermined level or more.

Examples of the resin constituting the composite material of the present invention include each thermoplastic resin and thermosetting resin, and the resin preferably contains a thermoplastic resin in view of formability. Specific examples thereof include a polyolefin resin such as a polyethylene resin or a polypropylene resin; a thermoplastic resin such as a polyvinyl chloride resin, an acrylonitrile-butadiene-styrene copolymer resin (ABS resin), an acrylonitrile-styrene copolymer resin (AS resin), a polyamide resin (nylon), a polyethylene terephthalate resin, a polybutylene terephthalate resin, and a polystyrene resin; and a thermoplastic biodegradable resin such as a 3-hydroxybutyrate-co-3-hydroxyhexanoate polymer resin (PHBH), a polybutylene succinate resin, and a polylactic acid resin. One or two or more kinds of these resins can be used for the composite material of the present invention. Among them, the resin of the composite material preferably contains a polyolefin resin, and 50 mass % or more (preferably 70 mass % or more) of the resin constituting the composite material is preferably a polyolefin resin.

The polyolefin resin is preferably a polyethylene resin or a polypropylene resin, or preferably a mixture of a polyethylene resin and a polypropylene resin (resin blend). Further, an ethylene-based copolymer such as an ethylene-vinyl acetate copolymer, an ethylene-ethyl acrylate copolymer, an ethylene-methyl methacrylate copolymer, an ethylene-acrylic acid copolymer, an ethylene-methacrylic acid copolymer, an ethylene-glycidyl methacrylate copolymer, or an ethylene-propylene copolymer (a copolymer containing ethylene as a constituent); or a resin such as polybutene is preferable as the polyolefin resin used in the composite material of the present invention. One kind of polyolefin resin may be used singly, or two or more kinds thereof may be used in combination. The polyolefin resin constituting the composite material of the present invention is preferably a polyethylene resin and/or a polypropylene resin, and more preferably a polyethylene resin.

Examples of the above polyethylene include a low density polyethylene (LDPE) and a high density polyethylene (HDPE).

The resin constituting the composite material of the present invention is preferably a polyolefin resin. The polyolefin in this polyolefin resin is preferably polyethylene, and more preferably a high density or low density polyethylene.

The above low density polyethylene means a polyethylene having a density of 880 kg/m$^3$ or more and less than 940 kg/m$^3$. The above high density polyethylene means a polyethylene having a density larger than the density of the above low density polyethylene.

The low density polyethylene may be so-called "low density polyethylene" or "ultralow density polyethylene" having long chain branching, or linear low density polyethylene (LLDPE) in which ethylene and a small amount of α-olefin monomer are copolymerized, or further may be an "ethylene-α-olefin copolymer elastomer" involved in the above density range.

At least part of the polyolefin resin may be a modified resin. Examples of the modified resin include an acid-modified resin such as a maleic acid-modified resin. The acid-modified resin may be included to improve the adhesion between the resin and the fiber and increase the mechanical strength of the composite material. Thus, a small amount of fiber may be blended to increase the mechanical strength of the composite material and increase, as a result, the mechanical strength and fluidity of the composite material simultaneously.

The composite material of the present invention may contain a plurality of types of resins as described above. Further, for example, a polyolefin resin and polyethylene terephthalate and/or nylon may be used in combination. In this case, the total amount of the polyethylene terephthalate and/or nylon is preferably 10 parts by mass or less based on 100 parts by mass of the polyolefin resin.

The content of the resin in the composite material of the present invention is preferably 30 mass % or more, more preferably 40 mass % or more, and further preferably 50 mass % or more. Further, the content of the resin in the composite material of the present invention is usually less than 99 mass %, preferably less than 95 mass %, more preferably less than 90 mass %, or also preferably less than 85 mass %.

Incidentally, when the total content of the fiber and the resin in the composite material is less than 100 mass %, the remainder can contain, for example, components described later, if appropriate, according to the purpose or raw materials to be used.

The composite material of the present invention is preferably in the form in which aluminum in addition to the fiber is dispersed in the resin. The thermal conductivity, visibility, light shielding property, and lubricity of the composite material are improved by including aluminum. When aluminum is dispersed in the resin of the composite material of the present invention, the content of the aluminum in the composite material is preferably 1 mass % or more and 30 mass % or less. The processability of the composite material can be further improved by adjusting the content of the aluminum to a level within this range, and a lump of aluminum is unlikely to occur during processing of the composite material. This aluminum can be derived from a thin aluminum film layer of polyethylene laminated paper as a raw material. In the thin aluminum film layer of the polyethylene laminated paper, aluminum is not melted during melt-kneading, but is gradually sheared and micronized by shear force during kneading.

When thermal conductivity, flame retardancy, and the like are considered in addition to the viewpoint of the processability, the content of the aluminum in the composite material of the present invention is preferably 5 mass % or more and 20 mass % or less.

In the aluminum dispersed in the composite material of the present invention, the average of the X-Y maximum length of individual aluminum is preferably 0.02 to 2 mm and more preferably 0.04 to 1 mm. The X-Y maximum length is determined by observing the surface of the composite material. In this observation surface, an X-axis maximum length or a Y-axis maximum length, whichever is longer, is taken as the X-Y maximum length by drawing a straight line in a specific direction (X-axis direction) relative to the aluminum dispersoid to measure the maximum distance (X-axis maximum length) where a distance connecting lines between two intersection points at which the straight line intersects with an outer periphery of the aluminum dispersoid becomes maximum, and drawing another straight line in a direction (Y-axis direction) perpendicular to the specific direction to measure the maximum distance (Y-axis maximum length) where a distance connecting lines between the two intersection points at which the Y-axis direction line intersects with the outer periphery of the aluminum dispersoid becomes maximum. The X-Y maximum length can be determined by using image analysis software.

When the composite material contains aluminum, this aluminum preferably contains an aluminum dispersoid having an X-Y maximum length of 0.005 mm or more. The proportion of the number of aluminum dispersoids having an X-Y maximum length of 1 mm or more with respect to the number of aluminum dispersoids having an X-Y maximum length of 0.005 mm or more is preferably less than 1%. The processability of the composite material can be further enhanced by adjusting this proportion to a level less than 1%. Also, the coloring of the composite material can be more stabilized. In addition, a lump of aluminum is unlikely to occur during processing of the composite material.

Further, lubricity can be improved by including aluminum. For example, even when formed sheets of the composite material as obtained by forming the composite material are layered, the formed sheets are unlikely to be closely adhered to each other, and thus are easily peeled. From the viewpoint of effectively exerting such effects of aluminum, aluminum in the composite material preferably has a scale-like structure, and further at least part of the aluminum preferably has a scale-like bent structure.

Furthermore, lubricity at normal temperature between moldings made of the composite material is improved by including aluminum, while adhesiveness during thermal fusion between the composite material and a metal is improved. When the composite material containing aluminum is thermally fused to aluminum foil, a peel strength of, for example, 1.0 N/10 mm or more between the aluminum foil and the composite material can be exhibited. This peel strength is the average of peel strengths observed when a sheet of the composite material and aluminum foil having a thickness of 0.1 mm are thermally fused at 170° C. for 5 minutes at 1 kg/cm² by heat pressing, the resulting material is cut out into a strip having a width of 25 mm, and the aluminum foil is then peeled off at 23° C. in the direction of 90° at a rate of 50 mm/min.

The composite material of the present invention can be shaped by further dispersing, in the polyolefin resin, resin particles different from the polyolefin resin. A composite material having further improved mechanical strength can be shaped by dispersing resin particles different from the polyolefin resin. The maximum diameter of the resin particles is preferably 10 μm or more and further preferably 50 μm or more. It is also preferable that the maximum diameter is 10 μm or more and the aspect ratio is 5 or more. In particular, the resin particle preferably has a scale-like shape, a maximum diameter of 10 μm or more, and an aspect ratio of 5 or more. In the composite material, the content of the resin particles is preferably 0.1 mass % or more and 30 mass % or less. Each resin particle preferably contains a resin having a melting point higher by 10° C. or more than the melting point of the polyolefin resin which becomes a matrix. Each resin particle also preferably contains a resin having a melting point at 170° C. or more and/or a resin exhibiting an endothermic peak at 170° C. or more and 350° C. or less measured by differential scanning calorimetry. This allows the resin particles to remain when the molding is formed by using the composite material, and thus makes it possible to further improve the strength of the resin composite material. Examples of the resin particles include resin particles made of at least one kind of polyethylene terephthalate, polybutylene terephthalate, and polyamide, and among them, polyethylene terephthalate is preferable.

Like in the case of using a resin other than the polyolefin resin as the matrix resin, it is possible to take a form in which resin particles different from the matrix resin are dispersed.

At least part of the above resin and/or fiber constituting the composite material of the present invention may be derived from a recycled material. At least part of the aluminum, polypropylene, polyethylene terephthalate, and/or nylon, which can be included in the composite material of the present invention, may also be derived from a recycled material. The production cost of the composite material can be reduced by utilizing the recycled material. In addition, waste can be reduced.

Examples of a source for the fiber include wastepaper, broken paper of laminated paper, packaging using laminated paper, paper sludge, wood, modified wood, a fiberboard, MDF (medium-density fiberboard), and a particle board, as well as a recovered material or cutting waste thereof.

The resin source used may be, for instance, a regenerated resin. Specific examples thereof include each molded article (e.g., a bottle (e.g., a polyethylene bottle, a PET bottle), a container, a plastic furniture pipe, a sheet, a film, or a packaging container), a material recovered therefrom, and plastic waste discharged at the time of manufacturing the molded article. Other examples include a laminated sheet having a resin layer.

The recycled material used may be a polyolefin resin sheet, a sheet of resin different from the polyolefin resin or a laminate including a polyolefin resin sheet and a sheet of resin different from the polyolefin resin. Further, a laminate having a structure in which a thin aluminum film sheet is laminated on this laminate can be used as a recycled material. A pulverized material thereof, for example, can also be used. A packaging material (e.g., a food pack) with a laminate structure having a polyolefin resin sheet and a sheet of resin different from the polyolefin resin can also be used as a recycled material.

Examples of the recycled material include polyethylene laminated paper having paper and a thin polyethylene film layer, polyethylene laminated paper having paper, a thin polyethylene film layer, and a thin aluminum film layer, or a beverage pack and/or food pack made of these processed papers, or wastepaper, and recycled resin. Use of a plurality of types of these materials is possible. More preferably, a thin polyethylene film piece having cellulose fiber attached as obtained by processing the above laminated paper and/or beverage/food pack by a pulper to strip off and remove a paper portion (hereinafter, referred to as "cellulose fiber-attached polyethylene thin film piece") is used as the recycled material. When the laminated paper and/or the beverage/food pack have a thin aluminum film layer, aluminum is also adhered to the cellulose fiber-attached polyethylene thin film piece.

When such a recycled material is used as a raw material, the composite material of the present invention can also be obtained by, for example, melt-kneading described later.

In the composite material of the present invention, the moisture content is preferably less than 1 mass %. The moisture content is the weight loss (mass %) when a thermogravimetric analysis (TGA) is performed from 23° C. to 120° C. at a heating rate of +10° C./min under a nitrogen atmosphere within 6 hours after production of the composite material.

The composite material of the present invention may contain one or more kinds of compounds of a metal salt of an organic acid, an organic acid, and silicone. A composite material containing such a compound(s) has improved flowability during heating and has less forming defects during forming. Preferred examples of the compound include a metal salt of a fatty acid such as zinc stearate or sodium stearate, and a fatty acid such as oleic acid or stearic acid.

The composite material of the present invention may contain an inorganic material. Flexural modulus, impact resistance, and flame retardancy can be improved by including the inorganic material. Examples of the inorganic material include calcium carbonate, talc, clay, magnesium oxide, aluminum hydroxide, magnesium hydroxide, and titanium oxide.

The composite material of the present invention may contain a flame retardant, an antioxidant, a stabilizer, a weathering agent, a compatibilizer, an impact improver, or a modifier depending on the purpose. The composite material of the present invention can contain an oil component and/or various types of additives for improving processability. Examples thereof include paraffin, modified polyethylene wax, stearate, hydroxy stearate, a vinylidene fluoride-based copolymer such as a vinylidene fluoride-hexafluoropropylene copolymer, and/or organic modified siloxane.

The composite material of the present invention can also contain carbon black, or each pigment or dye. The composite material of the present invention can contain a metallic luster colorant. The composite material of the present invention can also contain an electrical conductivity-imparting component such as electrically conductive carbon black. Further, the composite material of the present invention can also contain a thermal conductivity-imparting component.

The composite material of the present invention may be crosslinked. Examples of the crosslinking agent include organic peroxide, and specific examples include dicumyl peroxide. The composite material of the present invention may be in a crosslinked form obtained by a silane crosslinking method.

The shape of the composite material of the present invention is not particularly limited. For example, the composite material of the present invention may be molded into a pellet form, or may also be formed into a desired shape. When the composite material of the present invention is shaped like a pellet, this pellet is suitable as a material constituting a molding (resin product).

The application of the composite material of the present invention is not particularly limited, and the composite material of the present invention can be widely used as any of various members or raw materials therefor.

[Production of Fiber-Dispersed Resin Composite Material]

Subsequently, preferred embodiments of a method of producing the composite material of the present invention will be described below. The composite material of the present invention is not limited to those obtained by the following method as long as the specifics of the present invention are satisfied.

The composite material of the present invention can be made into a composite material excellent in coloring stability by adjusting the selection and blending of the fiber material to be used and performing the melt-kneading under specific conditions such as adding a polar additive. For example, a composite material excellent in coloring stability can be obtained by classifying fiber materials in advance, combining the fiber materials in a specific size range, and controlling the amount of polar additive such as water to be added during melt-kneading, the timing of addition, and others. In particular, a large amount (e.g., more than the blending amount of the resin) of polar additive such as water may be added in the middle of melt-kneading while the size of the fiber material to be blended is controlled. In this case, a composite material exhibiting desired coloring stability tends to be easily obtained.

Examples of the combination of fiber materials within the above specific size range include a combination of fiber material Y that has been pulverized and classified using a rotary cutter mill with a mesh diameter of 1 to 20 mmφ (preferably 1 to 15 mmφ) and fiber material Z that has been pulverized and classified using a mesh diameter of 0.3 to 2 mmφ (preferably 0.4 to 1.5 mmφ). Provided that [the mesh diameter for fiber material Y]>[the mesh diameter for fiber material Z] is met.

Addition of water makes the fiber length distribution of the fiber narrower relative to the average fiber length of the fiber in some cases. The reason for this is not clear, but it is presumed that, for example, the polar interaction between water and the fiber or an effect of mitigating share force during kneading by water works.

A typical kneading device such as a kneader or a twin screw extruder is applicable to the melt-kneading. Preferably, a batch-type kneading device such as a kneader can be applied to the melt-kneading. In the twin screw extruder, the kneading becomes excessive, the fiber length becomes short, and the distribution of the fiber length becomes too narrow. As a result, desired coloring tends not to be achieved.

The batch-type kneader such as a kneader may be used to easily control the fiber length and the fiber length distribution to a desired range. For example, a kneader that is a batch-type kneader may be used. In this case, after the fiber materials in a specific size range are combined, a large amount of water is added to some extent during kneading. As a result, the fiber length distribution can be in a desired range, and the mechanical strength of the composite material can be further enhanced. When water is added from the beginning at the time of kneading, the fiber length distribution in the resulting composite material becomes narrow, it is difficult to obtain desired coloring, and the mechanical strength of the composite material tends to be poor. This is because the time during which the fiber is in contact with water while the resin is not melted increases, as a result of which the action of water on the fiber becomes excessive. On the other hand, if no water is added, the fiber length distribution is widened, it is difficult to obtain desired coloring stability, and the strength of the composite material tends to be uneven. This seems to be because if no water is added, the fibers are stuck to and unlikely separated from each other, only part of the fibers is likely to be sheared during kneading, and the finer fibers become finer. Note that the above descriptions merely indicate a tendency, and this tendency may not be applied in some cases. However, it is effective to perform melt-kneading using the above tendency as one indicator in order to obtain a target composite material.

The addition of water, etc., can be performed, for example, when ⅓ to ½ of the entire melt-kneading time has elapsed. In addition, the amount of water added is preferably large to some extent, and can be about 1 to 3 times the blending amount of the resin on a mass basis.

Here, "melt-kneading" means kneading at a temperature at which the resin (thermoplastic resin) in the raw material is melted. The melt-kneading is preferably performed at a temperature and treatment time at which the fiber is not deteriorated. The wording "the fiber is not deteriorated" means that no significant discoloration, burning, or carbonization occurs in the fiber.

The temperature during the melt-kneading (temperature of the melt-knead product) is, for example, preferably from 110 to 280° C., more preferably from 130 to 220° C., or preferably from 150 to 200° C. when a case of using a polyethylene resin is taken as an example. In addition, the melt-kneading time can be set to, for example, about 5 minutes to 1 hour, preferably 7 to 30 minutes, or preferably 10 to 25 minutes. Further, the melt-kneading time in the presence of water is preferably 3 minutes or more, more preferably 5 minutes or more, or also preferably 10 minutes or more.

In particular, when a cellulose fiber material is used as a fiber source, a composite material having a desired fiber length distribution can be obtained with high efficiency by melt-kneading in the presence of water as described above.

[Molding]

The molding of the present invention is a molding formed by molding the composite material of the present invention into a desired shape. Examples of the molding of the present invention include a molding with each structure such as a sheet form, a plate form, or a tubular form. Examples of the tubular molding include a straight tube with a substantially cylindrical or square cross section, a curved tube, and a corrugated tube having a corrugated shape imparted. Examples of the tubular molding also include a divided body obtained by dividing the tubular molding (e.g., the straight tube with a substantially cylindrical or square cross section, the curved tube, the corrugated tube having a corrugated shape) into two pieces, for example. The molding of the present invention can also be used as a joint member for the tube as well as a member for civil engineering, building materials, automobiles, or protection of electrical cables. The molding of the present invention can be obtained by subjecting the composite material of the present invention to ordinary forming means such as injection molding, extrusion molding, press molding, or blow molding.

[Composite Member]

A composite member can be obtained by combining the molding of the present invention and another material (component). The form of this composite member is not particularly limited. For example, the composite member can be a composite member having a laminate structure in which a layer composed of the molding of the present invention and a layer composed of another material are combined. This composite member preferably has a tubular structure. Further, examples of the other material constituting the composite member in combination with the molding of the present invention include a thermoplastic resin material and a metal material.

For example, the composite material of the present invention can be used for being joined to a metal to form a composite. This composite can be a laminate including a layer of the composite material of the present invention and a metal layer. The composite is also preferably a coated metal tube having a coating layer, in which the composite material of the present invention is used on the outer circumference and/or inner circumference of a metal tube. The coated metal tube can be used as, for example, an electromagnetic wave shielding tube. The composite material of the present invention and metal are preferably joined in the form in which both are directly bonded. This joining can be performed by a routine method such as thermal fusing. The composite material of the present invention can also be used as an adhesive sheet. For example, in order to bond metal and a polyolefin resin material, the composite material of the present invention can be used as an adhesive resin layer by interposing the composite material between the metal and the polyolefin resin material. Further, the composite material of the present invention can be used as a hot melt adhesive.

The composite member of the present invention can be suitably used as a member for civil engineering, building materials or automobiles, or a raw material for these members.

When the composite material of the present invention is joined to metal to form a composite, the type of the metal is not particularly limited. The metal preferably contains at least one kind of compound of aluminum, copper, steel, an aluminum alloy, a copper alloy, stainless steel, a magnesium alloy, a lead alloy, silver, gold, and platinum. Among them, preferably, the metal contains at least one kind of compound of aluminum, an aluminum alloy, copper, and a copper alloy, and more preferably, the metal is at least one kind of compound of aluminum, an aluminum alloy, copper, and a copper alloy. The metal also preferably contains aluminum and/or an aluminum alloy, and is also preferably aluminum and/or an aluminum alloy.

EXAMPLES

The present invention will be described in more detail based on Examples. However, the present invention is not limited to them.

[Measurement Protocol/Evaluation Procedure]

<Maximum Color Difference A>

A test piece (a press sheet having a thickness of 2 mm) was prepared by injection molding a fiber-dispersed resin composite material. Next, respective L*, a*, and b* values in CIE (La*b*) color space were measured on a straight line at 8 points with a 1-cm interval by using a chromameter (CR-300, manufactured by KONICA MINOLTA; optical conditions: diffused illumination vertical light reception method (conforming to JIS Z8722/including specular reflection light); light source: a pulse xenon lamp; measurement diameter: φ8 mm). Then, the color difference ΔE1 between linearly adjacent measurement points was calculated by [Expression 1-1] below. The maximum value among 7 calculated values for the resulting color difference ΔE1 was taken as the maximum color difference A.

$$\Delta E1 = [(L^*_{i+1} - L^*_i)^2 + (a^*_{i+1} - a^*_i)^2 + (b^*_{i+1} - b^*_i)^2]^{0.5} \quad \text{[Expression 1-1]}$$

where $L^*_i$, $a^*_i$, and $b^*_i$ are the L*, a*, and b* values at i-th measurement point among the 8 measurement points, and i is an integer of 1 to 7 in [Expression 1-1].

The maximum color difference A was evaluated by applying the following criteria.

—Criteria for Maximum Color Difference A—
- ◎: The maximum color difference A is 0.2 or more and 3 or less.
- ○a: The maximum color difference A is 0.05 or more and less than 0.2.
- ○b: The maximum color difference A is more than 3 and 6 or less.
- xa: The maximum color difference A is less than 0.05.
- xb: The maximum color difference A is more than 6.

<Maximum Color Difference B>

A test piece (a press sheet having a thickness of 2 mm) was prepared by injection molding a fiber-dispersed resin composite material. Next, respective L*, a*, and b* values in CIE (La*b*) color space were measured on a straight line at 8 points with a 1-cm interval by using a chromameter (CR-300, manufactured by KONICA MINOLTA; optical conditions: diffused illumination vertical light reception method (conforming to JIS Z8722/including specular reflection light); light source: a pulse xenon lamp; measurement diameter: φ8 mm). The color difference ΔE2 was calculated by [Expression 1-2] below. The maximum value among 8 calculated values for the resulting color difference ΔE2 was taken as the maximum color difference B.

$$\Delta E2 = [(L_i^* - L_{ave}^*)^2 + (a_i^* - a_{ave}^*)^2 + (b_i^* - b_{ave}^*)^2]^{0.5} \quad \text{[Expression 1-2]}$$

where $L^*_i$, $a^*_i$, and $b^*_i$ are the L*, a*, and b* values at i-th measurement point among the 8 measurement points, and i is an integer of 1 to 8 in [Expression 1-2], and where $L^*_{ave}$ is an average of the L* values at the 8 measurement points, $a^*_{ave}$ is an average of the a* values at the 8 measurement points, and $b^*_{ave}$ is an average of the b* values at the 8 measurement points.

The maximum color difference B was evaluated by applying the following criteria.

—Criteria for Maximum Color Difference B—
- ◎: The maximum color difference B is 0.2 or more and 2 or less.
- ○a: The maximum color difference B is 0.05 or more and less than 0.2.
- ○b: The maximum color difference B is more than 2 and 4 or less.
- xa: The maximum color difference B is less than 0.05.
- xb: The maximum color difference B is more than 4.

<Fiber Content in Composite Material>

A composite material sample (10 mg) which had been dried in advance under the atmosphere at 80° C.×1 hour was subjected to a thermogravimetric analysis (TGA) from 23° C. to 400° C. under a nitrogen atmosphere at a heating rate of +10° C./min. Then, the content of plant fiber (mass %) was calculated by [Formula I] below. Five identical composite material samples were prepared, and the fiber contents (mass %) of the five composite material samples were averaged. Then, the average was taken as the content (mass %) of plant fiber in the composite material. In the composite materials of Examples or Comparative Examples, the raw material-derived fiber is cellulose fiber.

(content [mass %] of plant fiber)=(decrease [mg] in mass of composite material sample at 200 to 380° C.)×100/(mass [mg] of composite material sample in dried state before thermogravimetric analysis) [Formula I]

<Length-Weighted Average Fiber Length and Number-Averaged Fiber Length>

The length-weighted average fiber length and the number-averaged fiber length were measured for a hot xylene dissolution residue (insoluble component) of the composite material in accordance with Pulps-Determination of fiber length by automated optical analysis as specified by ISO 16065 2001 (JIS P8226 2006). Specifically, 0.1 to 1 g was cut out from a formed sheet of the composite material and taken as a sample, and this sample was wrapped with a 400-mesh stainless steel mesh, and immersed into 100 mL of xylene at 138° C. for 24 hours. Next, the sample was pulled up therefrom, and the sample was then dried in vacuum at 80° C. for 24 hours. The resulting hot xylene dissolution residue (insoluble component) of the composite material was used. Then, the length-weighted average fiber length and the number-averaged fiber length were determined by the Pulps-Determination of fiber length by automated optical analysis. MORFI COMPACT, manufactured by TECHPAP, was used in this measurement.

The following composite materials were prepared using a kneader, which is a batch-type kneader, as a melt-kneading apparatus at a kneading temperature of 160 to 180° C. and a kneading time of 10 to 20 minutes. The following describes how to prepare the composite material of each of Examples or Comparative Examples.

Example 1

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NOVATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 1-1 and melt-kneaded using a kneader to prepare a composite material in which the respective components were homogeneously mixed. In this melt-kneading, 120 parts by mass of water was added at the time when ½ of the kneading time had elapsed. The fiber-dispersed resin composite material of Example 1 was thus obtained.

Incidentally, in this Example 1, and later Examples and Comparative Examples, the moisture content of each of the obtained composite materials was less than 1 mass %.

Example 2

A fiber-dispersed resin composite material of Example 2 in which the respective components were homogeneously mixed was obtained in the same manner as in Example 1 except that a material (pulverized material 3) obtained by pulverizing broken paper of polyethylene laminated paper (having paper, a thin polyethylene film layer and a thin aluminum film layer) while using a rotary cutter mill (mesh diameter φ: 6 mm) was used instead of the pulverized material 1 in Example 1.

Example 3

A fiber-dispersed resin composite material of Example 3 in which the respective components were homogeneously mixed was obtained in the same manner as in Example 2 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 2 in Example 2.

Example 4

A fiber-dispersed resin composite material of Example 4 in which the respective components were homogeneously mixed was obtained in the same manner as in Example 1 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 1 in Example 1.

Example 5

A fiber-dispersed resin composite material of Example 5 in which the respective components were homogeneously mixed was obtained in the same manner as in Example 3 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Example 3.

Comparative Example 1

A fiber-dispersed resin composite material of Comparative Example 1 in which the respective components were homogeneously mixed was obtained in the same manner as in Example 1 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Example 1.

Comparative Example 2

High density polyethylene 1 (NOVATEC HJ490, manufactured by Japan Polyethylene Corporation) was used as Comparative Example 2.

The results of the respective Examples and Comparative Examples are shown in the following table.

TABLE 1

Table 1-1

|  | Ex. 1 | Ex. 2 | Ex. 3 | Ex. 4 | Ex. 5 | CEx. 1 | CEx. 2 |
|---|---|---|---|---|---|---|---|
| High density polyethylene 1 (parts by mass) | 56 | 56 | 56 | 56 | 56 | 56 | 100 |
| Pulverized material 1 (parts by mass) 15 mmφ | 30 |  |  |  |  |  |  |
| Pulverized material 2 (parts by mass) 0.5 mmφ | 10 | 10 |  | 10 | 30 | 10 |  |
| Pulverized material 3 (parts by mass) 6 mmφ |  | 30 | 30 |  |  |  |  |
| Pulverized material 4 (parts by mass) 1 mmφ |  |  | 10 | 30 | 10 |  |  |
| Pulverized material 5 (parts by mass) 30 mmφ |  |  |  |  |  | 30 |  |
| Acid-modified polyethylene resin 1 (parts by mass) | 4 | 4 | 4 | 4 | 4 | 4 | — |
| Fiber content (mass %) | 21.3 | 20.8 | 20.6 | 20.9 | 21.0 | 20.8 | — |
| Length-weighted average fiber length LL/Number-averaged fiber length LN | 1.47 | 1.38 | 1.27 | 1.13 | 1.09 | 1.51 | — |
| Length-weighted average fiber length LL (μm) | 1177 | 743 | 971 | 346 | 289 | 1210 | — |
| Number-averaged fiber length LN (μm) | 801 | 538 | 765 | 306 | 265 | 801 | — |
| Evaluation of maximum color difference A | ○b | ⊚ | ⊚ | ⊚ | ○a | Xb | Xa |
| Evaluation of maximum color difference B | ○b | ⊚ | ⊚ | ⊚ | ○a | Xb | Xa |

Remarks: 'Ex.' means Example according to this invention, and 'CEx.' means Comparative Example.

As shown in Table 1, in the composite materials in which the pulverized and classified fiber materials were used in combination and the LL/LN was controlled to be smaller than 1.50, the maximum color differences each fell within a specific range, the coloring was stable, and the color tone was provided such that dirt was inconspicuous.

Comparative Example 3

A material (pulverized material 1) obtained by pulverizing broken paper of polyethylene laminated paper (having paper, a thin polyethylene film layer, and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NOVATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 1-2 and melt-kneaded using a kneader to prepare a composite material in which the respective components were homogeneously mixed. In this melt-kneading, no water was added. The fiber-dispersed resin composite material of Comparative Example 3 was thus obtained.

Comparative Example 4

A fiber-dispersed resin composite material of Comparative Example 4 in which the respective components were homogeneously mixed was obtained in the same manner as in Comparative Example 3 except that a material (pulverized material 3) obtained by pulverizing broken paper of polyethylene laminated paper (having paper, a thin polyethylene film layer and a thin aluminum film layer) while using a rotary cutter mill (mesh diameter φ: 6 mm) was used instead of the pulverized material 1 in Comparative Example 3.

Comparative Example 5

A fiber-dispersed resin composite material of Comparative Example 5 in which the respective components were homogeneously mixed was obtained in the same manner as in Comparative Example 4 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 2 in Comparative Example 4.

Comparative Example 6

A fiber-dispersed resin composite material of Comparative Example 6 in which the respective components were homogeneously mixed was obtained in the same manner as in Comparative Example 3 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 1 in Comparative Example 3.

Comparative Example 7

A fiber-dispersed resin composite material of Comparative Example 7 in which the respective components were homogeneously mixed was obtained in the same manner as in Comparative Example 5 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Comparative Example 5.

Comparative Example 8

A fiber-dispersed resin composite material of Comparative Example 8 in which the respective components were homogeneously mixed was obtained in the same manner as in Comparative Example 3 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Comparative Example 3.

The results of the respective Comparative Examples are shown in the following table.

TABLE 1-2

|  | CEx. 3 | CEx. 4 | CEx. 5 | CEx. 6 | CEx. 7 | CEx. 8 |
|---|---|---|---|---|---|---|
| High density polyethylene 1 (parts by mass) | 56 | 56 | 56 | 56 | 56 | 56 |
| Pulverized material 1 (parts by mass) 15 mmφ | 30 |  |  |  |  |  |
| Pulverized material 2 (parts by mass) 0.5 mmφ | 10 | 10 |  | 10 | 30 | 10 |
| Pulverized material 3 (parts by mass) 6 mmφ |  | 30 | 30 |  |  |  |
| Pulverized material 4 (parts by mass) 1 mmφ |  |  | 10 | 30 | 10 |  |
| Pulverized material 5 (parts by mass) 30 mmφ |  |  |  |  |  | 30 |
| Acid-modified polyethylene resin 1 (parts by mass) | 4 | 4 | 4 | 4 | 4 | 4 |
| Fiber content (mass %) | 21.3 | 20.8 | 20.6 | 20.9 | 21.0 | 20.8 |
| Length-weighted average fiber length LL/ Number-averaged fiber length LN | 1.51 | 1.40 | 1.29 | 1.17 | 1.12 | 1.53 |
| Length-weighted average fiber length LL (µm) | 1214 | 818 | 985 | 413 | 317 | 1278 |
| Number-averaged fiber length LN (µm) | 804 | 584 | 764 | 353 | 283 | 833 |
| Evaluation of maximum color difference A | Xb | Xb | Xb | Xb | Xb | Xb |
| Evaluation of maximum color difference B | Xb | Xb | Xb | Xb | Xb | Xb |

Remarks: 'CEx.' means Comparative Example.

As shown in Table 1-2, when no water was added in melt-kneading, the resulting composite materials were each a composition in which the respective components were homogeneously mixed, but gave poor results in evaluation of each maximum color difference.

Example 6

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NOVATEC HJ490, manufactured by Japan Polyethylene Corporation), an acid-modified polyethylene resin 1 (maleic acid-modified polyethylene, FUSABOND, DuPont), and carbon black masterbatch 1 (CB-MB1) were mixed at the blend ratio shown in the upper rows in Table 2 and melt-kneaded by using a kneader to prepare a composite material in which the respective components were homogeneously mixed. In this melt-kneading, 120 parts by mass of water was added at the time when ½ of the kneading time had elapsed. The fiber-dispersed resin composite material of Example 6 was thus obtained.

Example 7

A fiber-dispersed resin composite material of Example 7 in which the respective components were homogeneously mixed was obtained in the same manner as in Example 6 except that a material (pulverized material 3) obtained by pulverizing broken paper of polyethylene laminated paper (having paper, a thin polyethylene film layer and a thin aluminum film layer) using a rotary cutter mill (mesh diameter φ: 6 mm) was used instead of the pulverized material 1 in Example 6.

Example 8

A fiber-dispersed resin composite material of Example 8 in which the respective components were homogeneously mixed was obtained in the same manner as in Example 7 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 2 in Example 7.

Example 9

A fiber-dispersed resin composite material of Example 9 in which the respective components were homogeneously mixed was obtained in the same manner as in Example 6 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 1 in Example 6.

Example 10

A fiber-dispersed resin composite material of Example 10 in which the respective components were homogeneously mixed was obtained in the same manner as in Example 8 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Example 8.

Comparative Example 9

A fiber-dispersed resin composite material of Comparative Example 9 in which the respective components were homogeneously mixed was obtained in the same manner as in Example 6 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Example 6.

Comparative Example 10

High density polyethylene 1 (NOVATEC HJ490, manufactured by Japan Polyethylene Corporation) and carbon black masterbatch 1 (CB-MB1) were mixed at the blend ratio shown in the upper rows in Table 2 and melt-kneaded using a kneader to prepare a composite material of Comparative Example 10 in which the respective components were homogeneously mixed.

The results of the respective Examples and Comparative Examples are shown in the following table.

TABLE 2

|  | Ex. 6 | Ex. 7 | Ex. 8 | Ex. 9 | Ex. 10 | CEx. 9 | CEx. 10 |
| --- | --- | --- | --- | --- | --- | --- | --- |
| High density polyethylene 1 (parts by mass) | 51 | 51 | 51 | 51 | 51 | 51 | 95 |
| Pulverized material 1 (parts by mass) 15 mmφ | 30 | | | | | | |
| Pulverized material 2 (parts by mass) 0.5 mmφ | 10 | 10 | | 10 | 30 | 10 | |
| Pulverized material 3 (parts by mass) 6 mmφ | | 30 | 30 | | | | |
| Pulverized material 4 (parts by mass) 1 mmφ | | | 10 | 30 | 10 | | |
| Pulverized material 5 (parts by mass) 30 mmφ | | | | | | 30 | |

TABLE 2-continued

|  | Ex. 6 | Ex. 7 | Ex. 8 | Ex. 9 | Ex. 10 | CEx. 9 | CEx. 10 |
|---|---|---|---|---|---|---|---|
| Acid-modified polyethylene resin 1 (parts by mass) | 4 | 4 | 4 | 4 | 4 | 4 | — |
| CB-MB1 (parts by mass) | 5 | 5 | 5 | 5 | 5 | 5 | 5 |
| Fiber content (mass %) | 21.1 | 20.7 | 20.8 | 21.2 | 21.1 | 20.9 | — |
| Length-weighted average fiber length LL/ Number-averaged fiber length LN | 1.48 | 1.39 | 1.28 | 1.14 | 1.09 | 1.52 | — |
| Length-weighted average fiber length LL (μm) | 1181 | 747 | 973 | 349 | 290 | 1210 | — |
| Number-averaged fiber length LN (μm) | 798 | 537 | 760 | 306 | 266 | 796 | — |
| Evaluation of maximum color difference A | ⊚ | ⊚ | ⊚ | ⊚ | ○a | Xb | Xa |
| Evaluation of maximum color difference B | ⊚ | ⊚ | ⊚ | ⊚ | ○a | Xb | Xa |

Remarks: 'Ex.' means Example according to this invention, and 'CEx.' means Comparative Example.

As shown in Table 2, in the composite materials in which the pulverized and classified fiber materials were used in combination and the LL/LN was controlled to be smaller than 1.50, the maximum color differences each fell within a specific range, the coloring was stable, and the color tone was provided such that dirt was inconspicuous.

Example 11

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NO-VATEC HJ490, manufactured by Japan Polyethylene Corporation), an acid-modified polyethylene resin 1 (maleic acid-modified polyethylene, FUSABOND, DuPont), and titanium oxide 1 (TITONE, SAKAI CHEMICAL INDUSTRY CO., LTD.) were mixed at the blend ratio shown in the upper rows in Table 3 and melt-kneaded using a kneader to prepare a composite material in which the respective components were homogeneously mixed. In this melt-kneading, 130 parts by mass of water was added at the time when ½ of the kneading time had elapsed. The fiber-dispersed resin composite material of Example 11 was thus obtained.

Example 12

A fiber-dispersed resin composite material of Example 12 in which the respective components were homogeneously mixed was obtained in the same manner as in Example 11 except that a material (pulverized material 3) obtained by pulverizing broken paper of polyethylene laminated paper (having paper, a thin polyethylene film layer and a thin aluminum film layer) using a rotary cutter mill (mesh diameter φ: 6 mm) was used instead of the pulverized material 1 in Example 11.

Example 13

A fiber-dispersed resin composite material of Example 13 in which the respective components were homogeneously mixed was obtained in the same manner as in Example 12 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 2 in Example 12.

Example 14

A fiber-dispersed resin composite material of Example 14 in which the respective components were homogeneously mixed was obtained in the same manner as in Example 11 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 1 in Example 11.

Example 15

A fiber-dispersed resin composite material of Example 15 in which the respective components were homogeneously mixed was obtained in the same manner as in Example 13 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Example 13.

Comparative Example 11

A fiber-dispersed resin composite material of Comparative Example 11 in which the respective components were homogeneously mixed was obtained in the same manner as in Example 11 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Example 11.

Comparative Example 12

High density polyethylene 1 (NOVATEC HJ490, manufactured by Japan Polyethylene Corporation) and titanium oxide 1 (TITONE, SAKAI CHEMICAL INDUSTRY CO., LTD.) were mixed at the blend ratio shown in the upper rows in Table 3 and melt-kneaded using a kneader to prepare a composite material of comparative example 12 in which the respective components were homogeneously mixed.

The results of the respective Examples and Comparative Examples are shown in the following table.

TABLE 3

| | Ex. 11 | Ex. 12 | Ex. 13 | Ex. 14 | Ex. 15 | CEx. 11 | CEx. 12 |
|---|---|---|---|---|---|---|---|
| High density polyethylene 1 (parts by mass) | 51 | 51 | 51 | 51 | 51 | 51 | 95 |
| Pulverized material 1 (parts by mass) 15 mmφ | 30 | | | | | | |
| Pulverized material 2 (parts by mass) 0.5 mmφ | 10 | 10 | | 10 | 30 | 10 | |
| Pulverized material 3 (parts by mass) 6 mmφ | | 30 | 30 | | | | |
| Pulverized material 4 (parts by mass) 1 mmφ | | | 10 | 30 | 10 | | |
| Pulverized material 5 (parts by mass) 30 mmφ | | | | | | 30 | |
| Acid-modified polyethylene resin 1 (parts by mass) | 4 | 4 | 4 | 4 | 4 | 4 | — |
| Titanium oxide 1 (parts by mass) | 5 | 5 | 5 | 5 | 5 | 5 | 5 |
| Fiber content (mass %) | 20.8 | 21.2 | 20.9 | 20.7 | 21.2 | 21.1 | — |
| Length-weighted average fiber length LL/ Number-averaged fiber length LN | 1.45 | 1.37 | 1.25 | 1.12 | 1.08 | 1.51 | — |
| Length-weighted average fiber length LL (μm) | 1153 | 741 | 965 | 343 | 273 | 1201 | — |
| Number-averaged fiber length LN (μm) | 795 | 541 | 772 | 306 | 252 | 795 | — |
| Evaluation of maximum color difference A | ◎ | ◎ | ◎ | ◎ | ○a | Xb | Xa |
| Evaluation of maximum color difference B | ◎ | ◎ | ◎ | ◎ | ○a | Xb | Xa |

Remarks: 'Ex.' means Example according to this invention, and 'CEx.' means Comparative Example.

As shown in Table 3, in the composite materials in which the pulverized and classified fiber materials were used in combination and the LL/LN was controlled to be smaller than 1.50, the maximum color differences each fell within a specific range, the coloring was stable, and the color tone was provided such that dirt was inconspicuous.

Example 16

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NO-VATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 4-1 and melt-kneaded using a kneader to prepare a composite material in which the respective components were homogeneously mixed. In this melt-kneading, 150 parts by mass of water was added at the time when ½ of the kneading time had elapsed. The fiber-dispersed resin composite material of Example 16 was thus obtained.

Example 17

A fiber-dispersed resin composite material of Example 17 in which the respective components were homogeneously mixed was obtained in the same manner as in Example 16 except that a material (pulverized material 3) obtained by pulverizing broken paper of polyethylene laminated paper (having paper, a thin polyethylene film layer and a thin aluminum film layer) using a rotary cutter mill (mesh diameter φ: 6 mm) was used instead of the pulverized material 1 in Example 16.

Example 18

A fiber-dispersed resin composite material of Example 18 in which the respective components were homogeneously mixed was obtained in the same manner as in Example 17 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 2 in Example 17.

Example 19

A fiber-dispersed resin composite material of Example 19 in which the respective components were homogeneously mixed was obtained in the same manner as in Example 16 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 1 in Example 16.

Example 20

A fiber-dispersed resin composite material of Example 20 in which the respective components were homogeneously mixed was obtained in the same manner as in Example 18 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Example 18.

Comparative Example 13

A fiber-dispersed resin composite material of Comparative Example 13 in which the respective components were homogeneously mixed was obtained in the same manner as in Example 16 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1.

The results of the respective Examples and Comparative Example are shown in the following table.

Comparative Example 14

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NOVATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 4-2 and melt-kneaded using a kneader to prepare a composite material in which the respective components were homogeneously mixed. In this melt-kneading, no water was added. The fiber-dispersed resin composite material of Comparative Example 14 was thus obtained.

Comparative Example 15

A fiber-dispersed resin composite material of Comparative Example 15 in which the respective components were homogeneously mixed was obtained in the same manner as in Comparative Example 14 except that a material (pulver

TABLE 4

Table 4-1

|  | Ex. 16 | Ex. 17 | Ex. 18 | Ex. 19 | Ex. 20 | CEx. 13 |
|---|---|---|---|---|---|---|
| High density polyethylene 1 (parts by mass) | 36 | 36 | 36 | 36 | 36 | 36 |
| Pulverized material 1 (parts by mass) 15 mmφ | 40 |  |  |  |  |  |
| Pulverized material 2 (parts by mass) 0.5 mmφ | 20 | 20 |  | 20 | 40 | 20 |
| Pulverized material 3 (parts by mass) 6 mmφ |  | 40 | 40 |  |  |  |
| Pulverized material 4 (parts by mass) 1 mmφ |  |  | 20 | 40 | 20 |  |
| Pulverized material 5 (parts by mass) 30 mmφ |  |  |  |  |  | 40 |
| Acid-modified polyethylene resin 1 (parts by mass) | 4 | 4 | 4 | 4 | 4 | 4 |
| Fiber content (mass %) | 31.7 | 31.4 | 31.9 | 31.4 | 31.5 | 31.6 |
| Length-weighted average fiber length LL/ Number-averaged fiber length LN | 1.48 | 1.37 | 1.28 | 1.15 | 1.09 | 1.53 |
| Length-weighted average fiber length LL (μm) | 1195 | 792 | 981 | 355 | 294 | 1261 |
| Number-averaged fiber length LN (μm) | 807 | 578 | 766 | 309 | 270 | 824 |
| Evaluation of maximum color difference A | ◯b | ◎ | ◎ | ◎ | ◯a | Xb |
| Evaluation of maximum color difference B | ◯b | ◎ | ◎ | ◎ | ◯a | Xb |

Remarks: 'Ex.' means Example according to this invention, and 'CEx.' means Comparative Example.

As shown in Table 4-1, in the composite materials in which the pulverized and classified fiber materials were used in combination and the LL/LN was controlled to be smaller than 1.50, the maximum color differences each fell within a specific range, the coloring was stable, and the color tone was provided such that dirt was inconspicuous.

ized material 3) obtained by pulverizing broken paper of polyethylene laminated paper (having paper, a thin polyethylene film layer and a thin aluminum film layer) while using a rotary cutter mill (mesh diameter φ: 6 mm) was used instead of the pulverized material 1 in Comparative Example 14.

Comparative Example 16

A fiber-dispersed resin composite material of Comparative Example 16 in which the respective components were homogeneously mixed was obtained in the same manner as in Comparative Example 15 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 2 in Comparative Example 15.

Comparative Example 17

A fiber-dispersed resin composite material of Comparative Example 17 in which the respective components were homogeneously mixed was obtained in the same manner as in Comparative Example 14 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 1 in Comparative Example 14.

Comparative Example 18

A fiber-dispersed resin composite material of Comparative Example 18 in which the respective components were homogeneously mixed was obtained in the same manner as in Comparative Example 16 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Comparative Example 16.

Comparative Example 19

A fiber-dispersed resin composite material of Comparative Example 19 in which the respective components were homogeneously mixed was obtained in the same manner as in Comparative Example 14 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Comparative Example 14.

The results of the respective Comparative Examples are shown in the following table.

TABLE 4-2

|  | CEx. 14 | CEx. 15 | CEx. 16 | CEx. 17 | CEx. 18 | CEx. 19 |
|---|---|---|---|---|---|---|
| High density polyethylene 1 (parts by mass) | 36 | 36 | 36 | 36 | 36 | 36 |
| Pulverized material 1 (parts by mass) 15 mmφ | 40 |  |  |  |  |  |
| Pulverized material 2 (parts by mass) 0.5 mmφ | 20 | 20 |  | 20 | 40 | 20 |
| Pulverized material 3 (parts by mass) 6 mmφ |  | 40 | 40 |  |  |  |
| Pulverized material 4 (parts by mass) 1 mmφ |  |  | 20 | 40 | 20 |  |
| Pulverized material 5 (parts by mass) 30 mmφ |  |  |  |  |  | 40 |
| Acid-modified polyethylene resin 1 (parts by mass) | 4 | 4 | 4 | 4 | 4 | 4 |
| Fiber content (mass %) | 31.5 | 31.3 | 31.4 | 31.2 | 31.3 | 31.8 |
| Length-weighted average fiber length LL/ Number-averaged fiber length LN | 1.53 | 1.41 | 1.31 | 1.23 | 1.16 | 1.56 |
| Length-weighted average fiber length LL (μm) | 1243 | 841 | 1005 | 441 | 325 | 1343 |
| Number-averaged fiber length LN (μm) | 812 | 596 | 767 | 356 | 280 | 869 |
| Evaluation of maximum color difference A | Xb | Xb | Xb | Xb | Xb | Xb |
| Evaluation of maximum color difference B | Xb | Xb | Xb | Xb | Xb | Xb |

Remarks: 'CEx.' means Comparative Example.

As shown in Table 4-2, when no water was added in melt-kneading, the resulting composite materials were each a composition in which the respective components were homogeneously mixed, but gave poor results in evaluation of each maximum color difference.

Comparative Example 20

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NOVATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 4-3 and melt-kneaded using a kneader to prepare a composite material in which the respective components were homogeneously mixed. In this melt-kneading, 10 parts by mass of water was added at the time when ½ of the kneading time had elapsed. The fiber-dispersed resin composite material of Comparative Example 20 was thus obtained.

Comparative Example 21

A fiber-dispersed resin composite material of Comparative Example 21 in which the respective components were homogeneously mixed was obtained in the same manner as in Comparative Example 20 except that a material (pulverized material 3) obtained by pulverizing broken paper of polyethylene laminated paper (having paper, a thin polyethylene film layer and a thin aluminum film layer) while using a rotary cutter mill (mesh diameter φ: 6 mm) was used instead of the pulverized material 1 in Comparative Example 20.

Comparative Example 22

A fiber-dispersed resin composite material of Comparative Example 22 in which the respective components were homogeneously mixed was obtained in the same manner as in Comparative Example 21 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 2 in Comparative Example 21.

Comparative Example 23

A fiber-dispersed resin composite material of Comparative Example 23 in which the respective components were homogeneously mixed was obtained in the same manner as in Comparative Example 20 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 1 in Comparative Example 20.

Comparative Example 24

A fiber-dispersed resin composite material of Comparative Example 24 in which the respective components were homogeneously mixed was obtained in the same manner as in Comparative Example 22 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Comparative Example 22.

Comparative Example 25

A fiber-dispersed resin composite material of Comparative Example 25 was obtained in the same manner as in Comparative Example 20 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Comparative Example 20.

The results of the respective Comparative Examples are shown in the following table.

TABLE 4-3

|  | CEx. 20 | CEx. 21 | CEx. 22 | CEx. 23 | CEx. 24 | CEx. 25 |
| --- | --- | --- | --- | --- | --- | --- |
| High density polyethylene 1 (parts by mass) | 36 | 36 | 36 | 36 | 36 | 36 |
| Pulverized material 1 (parts by mass) 15 mmφ | 40 | | | | | |
| Pulverized material 2 (parts by mass) 0.5 mmφ | 20 | 20 | | 20 | 40 | 20 |
| Pulverized material 3 (parts by mass) 6 mmφ | | 40 | 40 | | | |
| Pulverized material 4 (parts by mass) 1 mmφ | | | | 20 | 40 | 20 |
| Pulverized material 5 (parts by mass) 30 mmφ | | | | | | 40 |
| Acid-modified polyethylene resin 1 (parts by mass) | 4 | 4 | 4 | 4 | 4 | 4 |
| Fiber content (mass %) | 31.6 | 31.9 | 31.2 | 31.5 | 31.8 | 31.4 |
| Length-weighted average fiber length LL/ Number-averaged fiber length LN | 1.52 | 1.39 | 1.29 | 1.20 | 1.13 | 1.53 |
| Length-weighted average fiber length LL (μm) | 1195 | 822 | 997 | 423 | 314 | 1299 |
| Number-averaged fiber length LN (μm) | 736 | 591 | 772 | 352 | 278 | 849 |

TABLE 4-3-continued

|  | CEx. 20 | CEx. 21 | CEx. 22 | CEx. 23 | CEx. 24 | CEx. 25 |
|---|---|---|---|---|---|---|
| Evaluation of maximum color difference A | Xb | Xb | Xb | Xb | Xb | Xb |
| Evaluation of maximum color difference B | Xb | Xb | Xb | Xb | Xb | Xb |

Remarks: 'CEx.' means Comparative Example.

As shown in Table 4-3, when a small amount of water was added in melt-kneading, the resulting composite materials were each a composition in which the respective components were homogeneously mixed, but gave poor results in evaluation of each maximum color difference.

Example 21

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NOVATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 5-1 and melt-kneaded using a kneader to prepare a composite material in which the respective components were homogeneously mixed. In this melt-kneading, 120 parts by mass of water was added at the time when ½ of the kneading time had elapsed. The fiber-dispersed resin composite material of Example 21 was thus obtained.

Example 22

A fiber-dispersed resin composite material of Example 22 in which the respective components were homogeneously mixed was obtained in the same manner as in Example 21 except that a material (pulverized material 3) obtained by pulverizing broken paper of polyethylene laminated paper (having paper, a thin polyethylene film layer and a thin aluminum film layer) using a rotary cutter mill (mesh diameter φ: 6 mm) was used instead of the pulverized material 1 in Example 21.

Example 23

A fiber-dispersed resin composite material of Example 23 in which the respective components were homogeneously mixed was obtained in the same manner as in Example 22 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 2 in Example 22.

Example 24

A fiber-dispersed resin composite material of Example 24 in which the respective components were homogeneously mixed was obtained in the same manner as in Example 21 except that a material (pulverized material 4) obtained by pulverizing broken paper of polyethylene laminated paper (having paper, a thin polyethylene film layer and a thin aluminum film layer) using a rotary cutter mill (mesh diameter φ: 1 mm) was used instead of the pulverized material 1 in Example 21.

Example 25

A fiber-dispersed resin composite material of Example 25 in which the respective components were homogeneously mixed was obtained in the same manner as in Example 23 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Example 23.

Comparative Example 26

A fiber-dispersed resin composite material of Comparative Example 26 was obtained in the same manner as in Example 21 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Example 21.

The results of the respective Examples and Comparative Example are shown in the following table.

TABLE 5

Table 5-1

|  | Ex. 21 | Ex. 22 | Ex. 23 | Ex. 24 | Ex. 25 | CEx. 26 |
|---|---|---|---|---|---|---|
| High density polyethylene 1 (parts by mass) | 36 | 36 | 36 | 36 | 36 | 36 |
| Pulverized material 1 (parts by mass) 15 mmφ | 15 |  |  |  |  |  |
| Pulverized material 2 (parts by mass) 0.5 mmφ | 5 | 5 |  | 5 | 15 | 5 |

TABLE 5-continued

Table 5-1

|  | Ex. 21 | Ex. 22 | Ex. 23 | Ex. 24 | Ex. 25 | CEx. 26 |
|---|---|---|---|---|---|---|
| Pulverized material 3 (parts by mass) 6 mmφ |  | 15 | 15 |  |  |  |
| Pulverized material 4 (parts by mass) 1 mmφ |  |  | 5 | 15 | 5 |  |
| Pulverized material 5 (parts by mass) 30 mmφ |  |  |  |  |  | 15 |
| Acid-modified polyethylene resin 1 (parts by mass) | 4 | 4 | 4 | 4 | 4 | 4 |
| Fiber content (mass %) | 10.3 | 10.6 | 10.2 | 10.5 | 10.7 | 10.5 |
| Length-weighted average fiber length LL/ Number-averaged fiber length LN | 1.45 | 1.37 | 1.25 | 1.12 | 1.08 | 1.51 |
| Length-weighted average fiber length LL (μm) | 1121 | 738 | 962 | 343 | 278 | 1201 |
| Number-averaged fiber length LN (μm) | 773 | 539 | 770 | 306 | 257 | 795 |
| Evaluation of maximum color difference A | ○b | ◎ | ◎ | ◎ | ○a | Xb |
| Evaluation of maximum color difference B | ○b | ◎ | ◎ | ◎ | ○a | Xb |

Remarks: 'Ex.' means Example according to this invention, and 'CEx.' means Comparative Example.

As shown in Table 5-1, in the composite materials in which the pulverized and classified fiber materials were used in combination and the LL/LN was controlled to be smaller than 1.50, the maximum color differences each fell within a specific range, the coloring was stable, and the color tone was provided such that dirt was inconspicuous.

Comparative Example 27

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NO-VATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 5-2 and melt-kneaded using a kneader to prepare a composite material in which the respective components were homogeneously mixed. In this melt-kneading, no water was added. The fiber-dispersed resin composite material of Comparative Example 27 was thus obtained.

Comparative Example 28

A fiber-dispersed resin composite material of Comparative Example 28 in which the respective components were homogeneously mixed was obtained in the same manner as in Comparative Example 27 except that a material (pulverized material 3) obtained by pulverizing broken paper of polyethylene laminated paper (having paper, a thin polyethylene film layer and a thin aluminum film layer) while using a rotary cutter mill (mesh diameter φ: 6 mm) was used instead of the pulverized material 1 in Comparative Example 27.

Comparative Example 29

A fiber-dispersed resin composite material of Comparative Example 29 in which the respective components were homogeneously mixed was obtained in the same manner as in Comparative Example 28 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 2 in Comparative Example 28.

Comparative Example 30

A fiber-dispersed resin composite material of Comparative Example 30 in which the respective components were homogeneously mixed was obtained in the same manner as in Comparative Example 27 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 1 in Comparative Example 27.

Comparative Example 31

A fiber-dispersed resin composite material of Comparative Example 31 in which the respective components were homogeneously mixed was obtained in the same manner as in Comparative Example 29 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Comparative Example 29.

Comparative Example 32

A fiber-dispersed resin composite material of Comparative Example 32 was obtained in the same manner as in Comparative Example 27 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Comparative Example 27.

The results of the respective Comparative Examples are shown in the following table.

TABLE 5-2

|  | CEx. 27 | CEx. 28 | CEx. 29 | CEx. 30 | CEx. 31 | CEx. 32 |
|---|---|---|---|---|---|---|
| High density polyethylene 1 (parts by mass) | 36 | 36 | 36 | 36 | 36 | 36 |
| Pulverized material 1 (parts by mass) 15 mmφ | 15 |  |  |  |  |  |
| Pulverized material 2 (parts by mass) 0.5 mmφ | 5 | 5 |  | 5 | 15 | 5 |
| Pulverized material 3 (parts by mass) 6 mmφ |  | 15 | 15 |  |  |  |
| Pulverized material 4 (parts by mass) 1 mmφ |  |  | 5 | 15 | 5 |  |
| Pulverized material 5 (parts by mass) 30 mmφ |  |  |  |  |  | 15 |
| Acid-modified polyethylene resin 1 (parts by mass) | 4 | 4 | 4 | 4 | 4 | 4 |
| Fiber content (mass %) | 10.5 | 10.4 | 10.6 | 10.8 | 10.3 | 10.4 |
| Length-weighted average fiber length LL/ Number-averaged fiber length LN | 1.46 | 1.40 | 1.29 | 1.16 | 1.10 | 1.53 |
| Length-weighted average fiber length LL (μm) | 1152 | 764 | 983 | 366 | 292 | 1271 |
| Number-averaged fiber length LN (μm) | 789 | 546 | 762 | 316 | 265 | 831 |
| Evaluation of maximum color difference A | Xb | Xb | Xb | Xb | Xb | Xb |
| Evaluation of maximum color difference B | Xb | Xb | Xb | Xb | Xb | Xb |

Remarks: 'CEx.' means Comparative Example.

As shown in Table 5-2, when no water was added in melt-kneading, the resulting composite materials were each a composition in which the respective components were homogeneously mixed, but gave poor results in evaluation of each maximum color difference.

Comparative Example 33

A material (pulverized material 1) obtained by pulverizing broken paper of polyethylene laminated paper (having paper, a thin polyethylene film layer and a thin aluminum film layer) while using a rotary cutter mill (mesh diameter φ: 15 mm), a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm), high density polyethylene 1 (NOVATEC HJ490, manufactured by Japan Polyethylene Corporation), and an acid-modified polyethylene resin 1 (maleic acid-modified polyethylene, FUSABOND, DuPont) were mixed at the blend ratio shown in the upper rows in Table 5-3 and melt-kneaded using a kneader to prepare a composite material in which the respective components were homogeneously mixed. In this melt-kneading, 5 parts by mass of water was added at the time when ½ of the kneading time had elapsed. The fiber-dispersed resin composite material of Comparative Example 33 was thus obtained.

Comparative Example 34

A fiber-dispersed resin composite material of Comparative Example 34 in which the respective components were homogeneously mixed was obtained in the same manner as in Comparative Example 33 except that a material (pulverized material 3) obtained by pulverizing broken paper of polyethylene laminated paper (having paper, a thin polyethylene film layer and a thin aluminum film layer) while using a rotary cutter mill (mesh diameter φ: 6 mm) was used instead of the pulverized material 1 in Comparative Example 33.

Comparative Example 35

A fiber-dispersed resin composite material of Comparative Example 35 in which the respective components were homogeneously mixed was obtained in the same manner as in Comparative Example 34 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 2 in Comparative Example 34.

Comparative Example 36

A fiber-dispersed resin composite material of Comparative Example 36 in which the respective components were homogeneously mixed was obtained in the same manner as in Comparative Example 33 except that a material (pulverized material 4) obtained by pulverizing broken paper of polyethylene laminated paper (having paper, a thin polyethylene film layer and a thin aluminum film layer) while using a rotary cutter mill (mesh diameter φ: 1 mm) was used instead of the pulverized material 1 in Comparative Example 33.

Comparative Example 37

A fiber-dispersed resin composite material of Comparative Example 37 in which the respective components were homogeneously mixed was obtained in the same manner as in Comparative Example 35 except that a material (pulverized material 2) obtained by pulverizing broken paper of polyethylene laminated paper (having paper, a thin polyethylene film layer and a thin aluminum film layer) while using a rotary cutter mill (mesh diameter φ: 0.5 mm) was used instead of the pulverized material 3 in Comparative Example 35.

Comparative Example 38

A fiber-dispersed resin composite material of Comparative Example 38 in which the respective components were homogeneously mixed was obtained in the same manner as in Comparative Example 33 except that a material (pulverized material 5) obtained by pulverizing broken paper of polyethylene laminated paper (having paper, a thin polyethylene film layer and a thin aluminum film layer) while using a rotary cutter mill (mesh diameter φ: 30 mm) was used instead of the pulverized material 1 in Comparative Example 33.

The results of the respective Comparative Examples are shown in the following table.

As shown in Table 5-3, when a small amount of water was added in melt-kneading, the resulting composite materials were each a composition in which the respective components were homogeneously mixed, but gave poor results in evaluation of each maximum color difference.

Having described our invention as related to the present embodiments, it is our intention that the invention should not be limited by any of the details of the description, unless otherwise specified, but rather be construed broadly within its spirit and scope as set out in the accompanying claims.

The invention claimed is:

1. A fiber-dispersed resin composite material, comprising fiber dispersed in a resin, wherein the content of the fiber in the fiber-dispersed resin composite material is 1 mass % or more and less than 70 mass %, and wherein the fiber-dispersed resin composite material has a maximum color difference A determined under conditions below of 0.05 or more and 6 or less:

<Conditions>

L*, a*, and b° values in CIE (L*a*b*) color space are measured on a straight line at 8 points with an interval of 1 cm by using a chromameter, and a color difference ΔE1 between measurement points linearly adjacent to each other is calculated by [Expression 1-1] below while a maximum value among 7 calculated values for the resulting color difference ΔE1 is set as the maximum color difference A, $$\Delta E1 = \left[(L^*_{i+1} - L^*_i)^2 + (a^*_{i+1} - a^*_i)^2 + (b^*_{i+1} - b^*_i)^2\right]^{0.5} \quad \text{[Expression 1-1]}$$

where $L^*_i$, $a^*_i$, and $b^*_i$ are the L*, a*, and b* values at i-th measurement point among the 8 measurement points, and i is an integer of 1 to 7 in [Expression 1-1].

TABLE 5-3

| | CEx. 33 | CEx. 34 | CEx. 35 | CEx. 36 | CEx. 37 | CEx. 38 |
|---|---|---|---|---|---|---|
| High density polyethylene 1 (parts by mass) | 36 | 36 | 36 | 36 | 36 | 36 |
| Pulverized material 1 (parts by mass) 15 mmφ | 15 | | | | | |
| Pulverized material 2 (parts by mass) 0.5 mmφ | 5 | 5 | | 5 | 15 | 5 |
| Pulverized material 3 (parts by mass) 6 mmφ | | 15 | 15 | | | |
| Pulverized material 4 (parts by mass) 1 mmφ | | | 5 | 15 | 5 | |
| Pulverized material 5 (parts by mass) 30 mmφ | | | | | | 15 |
| Acid-modified polyethylene resin 1 (parts by mass) | 4 | 4 | 4 | 4 | 4 | 4 |
| Fiber content (mass %) | 10.5 | 10.4 | 10.6 | 10.8 | 10.3 | 10.4 |
| Length-weighted average fiber length LL/ Number-averaged fiber length LN | 1.48 | 1.38 | 1.26 | 1.15 | 1.09 | 1.53 |
| Length-weighted average fiber length LL (μm) | 1186 | 755 | 941 | 354 | 287 | 1242 |
| Number-averaged fiber length LN (μm) | 801 | 547 | 747 | 308 | 263 | 812 |
| Evaluation of maximum color difference A | Xb | Xb | Xb | Xb | Xb | Xb |
| Evaluation of maximum color difference B | Xb | Xb | Xb | Xb | Xb | Xb |

Remarks: 'CEx.' means Comparative Example.

2. The fiber-dispersed resin composite material according to claim 1, which has a maximum color difference B determined under conditions below of 0.05 or more and 4 or less:

<Conditions>

L*, a*, and b* values in CIE (L'a*b*) color space are measured on a straight line at 8 points with an interval of 1 cm by using a chromameter, and a color difference ΔE2 is calculated by [Expression 1-2] below while a maximum value among 8 calculated values for the resulting color difference ΔE2 is set as the maximum color difference B, $$\Delta E2 = [(L_i^* - L_{ave}^*)^2 + (a_i^* - a_{ave}^*)^2 + (b_i^* - b_{ave}^*)^2]^{0.5} \quad \text{[Expression 1-2]}$$

where $L'_i$, $a^*_i$, and $b^*_i$ are the L*, a*, and b* values at i-th measurement point among the 8 measurement points, and i is an integer of 1 to 8 in [Expression 1-2], and where $L^*_{ave}$ is an average of the L* values at the 8 measurement points, $a^*_{ave}$ is an average of the a* values at the 8 measurement points, and $b^*_{ave}$ is an average of the b* values at the 8 measurement points.

3. The fiber-dispersed resin composite material according to claim 1, wherein a length-weighted average fiber length of the fiber is 0.3 mm or more.

4. The fiber-dispersed resin composite material according to claim 1, wherein the content of the fiber in the fiber-dispersed resin composite material is 5 mass % or more and less than 50 mass %.

5. The fiber-dispersed resin composite material according to claim 1, wherein the fiber comprises plant fiber.

6. The fiber-dispersed resin composite material according to claim 5, wherein the content determined by measurement protocol below of the plant fiber in the fiber-dispersed resin composite material is 5 mass % or more and less than 50 mass %:

<Measurement Protocol> a sample of the fiber-dispersed resin composite material is subjected to a thermogravimetric analysis under a nitrogen atmosphere at a heating rate of +10° C./min and a content of the plant fiber in the fiber-dispersed resin composite material is calculated from [Formula I] below:

(the content (mass %) of the plant fiber)=(a decrease in mass of the sample at 200 to 380° C.)×100/ (mass of the sample before the thermogravimetric analysis). [Formula I]

7. The fiber-dispersed resin composite material according to claim 1, wherein the resin comprises one or two or more of a polyolefin resin, an acrylonitrile-butadiene-styrene copolymer resin, an acrylonitrile-styrene copolymer resin, a polyamide resin, a polyvinyl chloride resin, a polyethylene terephthalate resin, a polybutylene terephthalate resin, a polystyrene resin, a 3-hydroxybutyrate-co-3-hydroxyhexanoate polymer resin, a polybutylene succinate resin, or a polylactic acid resin.

8. The fiber-dispersed resin composite material according to claim 1, comprising aluminum dispersed in the resin.

9. The fiber-dispersed resin composite material according to claim 1, comprising one or more of a metal salt of an organic acid, an organic acid, or silicone.

10. The fiber-dispersed resin composite material according to claim 1, comprising resin particles dispersed in the resin dispersing the fiber contained in the fiber-dispersed resin composite material, wherein the resin particles are made of a resin different from the resin dispersing the fiber contained in the fiber-dispersed resin composite material.

11. The fiber-dispersed resin composite material according to claim 1, wherein at least part of the resin and/or at least part of the fiber is derived from a recycled material.

12. A molding, which is obtainable by using the fiber-dispersed resin composite material according to claim 1.

13. A composite member, comprising: the molding according to claim 12; and another material in combination.

* * * * *